UNITED STATES PATENT OFFICE.

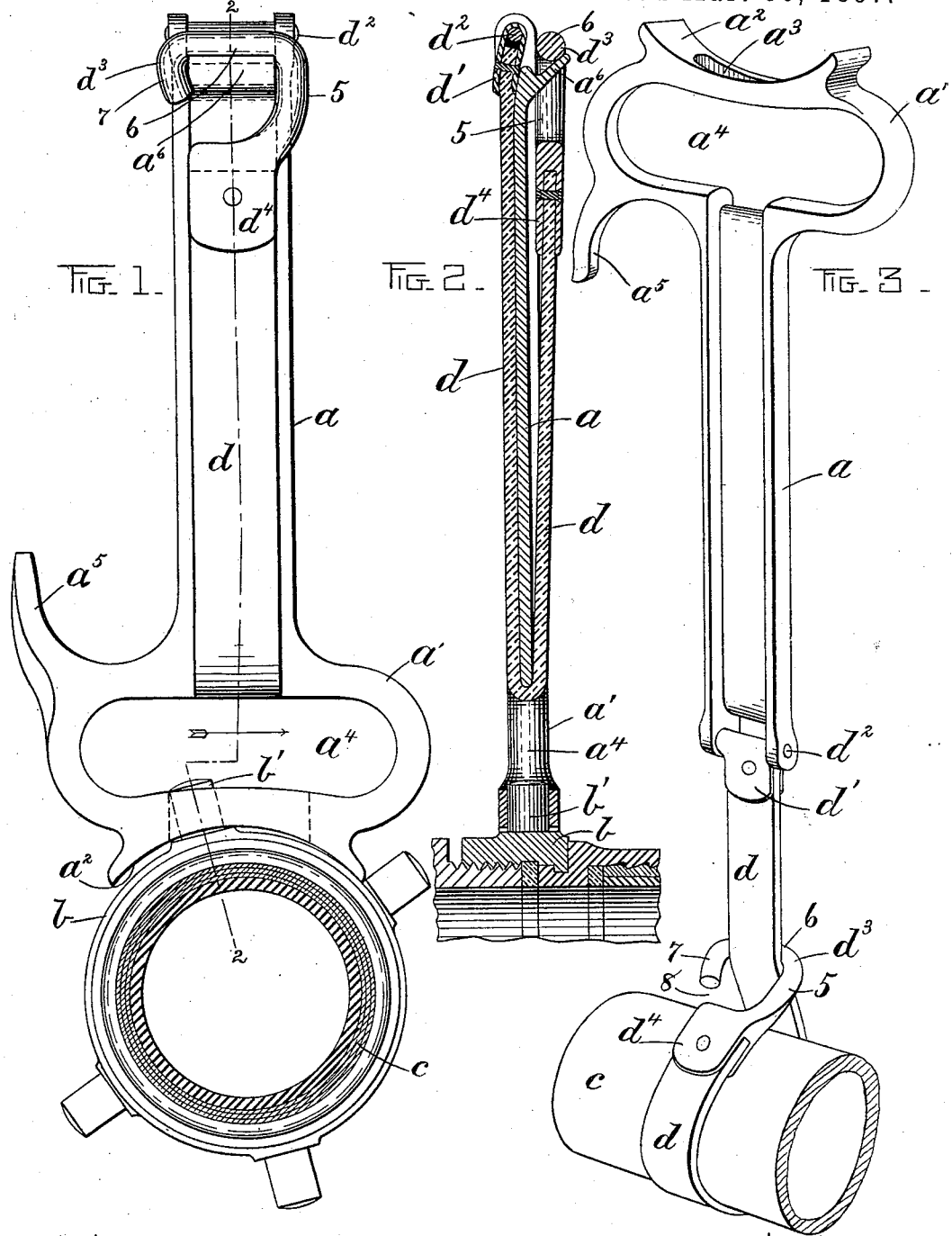

THOMAS HALEY, OF CAMBRIDGE, MASSACHUSETTS, ASSIGNOR OF ONE-HALF TO MILTON H. HART, OF BOSTON, MASSACHUSETTS.

HOSE-STRAP AND SPANNER.

SPECIFICATION forming part of Letters Patent No. 579,748, dated March 30, 1897.

Application filed October 26, 1896. Serial No. 610,022. (No model.)

*To all whom it may concern:*

Be it known that I, THOMAS HALEY, of Cambridge, in the county of Middlesex and State of Massachusetts, have invented certain new and useful Improvements in a Combined Hose-Strap and Spanner, of which the following is a specification.

This invention has for its object to provide a combination-tool for use of firemen adapted for use either as a spanner to connect and disconnect the members of a hose-coupling or as a suspension device to support the hose from a ladder or other elevated support.

The invention consists in the improvements which I will now proceed to describe and claim.

Of the accompanying drawings, forming a part of this specification, Figure 1 represents a side view of my improved tool adapted for use as a spanner. Fig. 2 represents a section on line 2 2 of Fig. 1. Fig. 3 represents a perspective view showing the tool used as a hose-suspending device.

The same letters and numerals of reference indicate the same parts in all the figures.

In the drawings, $a$ represents an elongated metal shank, on one end of which is formed a head or enlargement $a'$. Said head or enlargement comprises a concave seat $a^2$, adapted to fit the periphery of one of the members $b$ of a hose-coupling and containing a slot or opening $a^3$, adapted to receive the usual horn or nipple $b'$, formed on the member $b$. When the seat $a^2$ is applied to the member $b$, as indicated in Fig. 1, its slot $a^3$ receiving the horn $b'$, a movement of the shank $a$ in the direction indicated by the arrow in Fig. 1 will cause a partial rotation of the member $b$, thus connecting it with or disconnecting it from the complemental member of the coupling. The shank $a$ and its head $a'$ therefore constitute a spanner, the operation of which will be readily understood.

The head $a'$ is preferably made hollow, having an opening $a^4$ formed to permit the head to be grasped conveniently in the hand of a fireman and held with the shank projecting downwardly, as shown in Fig. 3. A hook $a^5$ is formed on one end of the head, said hook being adapted to engage a ladder-rung or other object from which it is desired to suspend a hose $c$. To the end of the shank $a$ opposite the head $a'$ is connected a flexible strap $d$, which is preferably provided with a metallic clip or socket-piece $d'$ at one end, receiving a pin $d^2$, inserted in ears formed on the end of the shank $a$, the strap and shank being thus pivotally connected. To the outer end of the strap is secured a hook $d^3$, which is provided with a clamping portion $d^4$, securely riveted to the strap, and comprises an arm 5, formed on the portion $d^4$, a cross-bar 6, of greater length than the width of the strap, and an arm 7, projecting inwardly from one end of the cross-bar and separated from the clamping portion $d^4$ by means of an opening 8 of sufficient width to receive the strap $d$.

When the device is adapted for use as a spanner, the strap is folded on the shank $a$, as shown in Figs. 1 and 2, and the hook $d^3$ is engaged with an ear $a^6$, formed on one side of the shank $a$, said ear being somewhat inclined, as shown in Fig. 2, to form a recess into which the cross-bar 6 of the hook $d^3$ drops and in which said cross-bar is held by the elasticity of the strap, the latter being proportioned so that it will be put under slight tension by the act of carrying it around the shank and engaging the hook with the ear $a^6$. The sides of the shank $a$ are preferably recessed or grooved for the reception of the strap, so that when the strap is folded upon the shank it will not materially increase the thickness of the shank and will not be liable to be displaced edgewise, the edges of the grooves forming abutments which hold the strap in place on the shank.

When it is desired to use the device to suspend a length of hose from an elevated point, the fireman detaches the hook $d^3$ from the ear $a^6$ and forms the strap into a loop or bight surrounding the hose by engaging the hook $d^3$ with a portion of the strap adjacent to the point where it is pivoted to the shank, as shown in Fig. 3. This is accomplished by moving the hook $d^3$ upon the strap so that the strap will enter the space inclosed by said hook, whereupon the strap will bear upon the cross-bar 6 and will be confined in said space by the arms 5 7. The device may be held in the hand of the fireman by means of the hand-opening $a^4$, or it may be suspended from the rung of a ladder or other object by means of the hook $a^5$.

It will be seen that the above-described device constitutes a very convenient implement for the use of firemen for the purposes described.

I do not limit myself to the particular form of the parts of my improved combination-tool here shown and described, and may variously modify the same without departing from the spirit of my invention.

I claim—

1. A tool of the character specified, comprising a shank having at one end a spanner-head formed also as a handle, and a hook adapted to engage a support, and at the other end an ear or detent; and a flexible strap secured to the shank near said detent, and provided at its free end with a bight-forming hook or eye adapted also to engage the detent.

2. A tool of the character specified, comprising a shank having at one end a spanner-head formed also as a handle, and a hook adapted to engage a support, and at the other end an ear or detent; and a flexible strap secured to the shank near said detent and provided at its free end with a bight-forming hook or eye adapted also to engage the detent, the sides of the shank being recessed to receive the strap when the latter is folded and engaged with the detent.

In testimony whereof I have signed my name to this specification, in the presence of two subscribing witnesses, this 21st day of October, A. D. 1896.

THOMAS HALEY.

Witnesses:
A. D. HARRISON,
C. F. BROWN.